(12) United States Patent
Konzelmann et al.

(10) Patent No.: US 7,162,920 B2
(45) Date of Patent: Jan. 16, 2007

(54) DEVICE FOR DETERMINING AT LEAST ONE PARAMETER OF A MEDIUM FLOWING IN A CONDUIT

(75) Inventors: Uwe Konzelmann, Asperg (DE); Christoph Gmelin, Stuttgart (DE)

(73) Assignee: Robert Bosch GmbH, Stuttgard (DE)

( * ) Notice: Subject to any disclaimer, the term of this patent is extended or adjusted under 35 U.S.C. 154(b) by 1 day.

(21) Appl. No.: 11/189,041

(22) Filed: Jul. 21, 2005

(65) Prior Publication Data

US 2006/0021429 A1   Feb. 2, 2006

(30) Foreign Application Priority Data

Jul. 23, 2004   (DE) .................. 10 2004 035 893

(51) Int. Cl.
*G01F 1/68* (2006.01)
(52) U.S. Cl. .................................. 73/202.5; 73/204.21
(58) Field of Classification Search ............. None
See application file for complete search history.

(56) References Cited

U.S. PATENT DOCUMENTS 5,804,718 A * 9/1998 Nagasaka et al. ............ 73/202
6,526,822 B1 * 3/2003 Maeda et al. ............. 73/204.21
6,619,140 B1 * 9/2003 Kitahara et al. .......... 73/861.52
2006/0150730 A1 * 7/2006 Lenzing et al. ............ 73/202.5

FOREIGN PATENT DOCUMENTS

DE    101 35 142    10/2002

* cited by examiner

*Primary Examiner*—Harshad Patel
(74) *Attorney, Agent, or Firm*—Kenyon & Kenyon LLP

(57) ABSTRACT

Devices are previously known for determining at least one parameter of a medium flowing in a conduit, in particular for determining the air mass flow in the intake section of an internal combustion engine, having a conduit part and a sensor device that has a bypass part. In order to avoid a flow detachment at the side walls of the bypass part, it is provided that a flow vane, running at least approximately parallel to a side wall, provided with a separation opening, of the bypass part, be provided in a conduit part behind a separation opening, seen in the main flow direction, and that the conduit part be provided, in the area of the bypass part, with at least one projection that protrudes from an inner wall of the conduit part towards the bypass part.

10 Claims, 4 Drawing Sheets

DEVICE FOR DETERMINING AT LEAST ONE PARAMETER OF A MEDIUM FLOWING IN A CONDUIT

BACKGROUND INFORMATION

A device is described for example in German Patent Application No. DE 101 35 142, and is used for example in the intake section of an internal combustion engine to determine the air mass flow that is supplied to the internal combustion engine through a conduit. A segment, provided with a bypass part, of a sensor device is placed into the conduit part through a plug-in opening. The bypass part has a channel structure having an inlet area from which a measurement channel branches off that is provided with the measurement element. The inlet area additionally has a separation zone having at least one separation opening that opens into the conduit passageway at at least one side wall of the bypass part. The separation zone is used to separate out liquid and/or solid particles from the channel structure, so that they are prevented from entering the measurement channel provided with the measurement element and contaminating the measurement element.

In the known devices, the edges formed by the front side, facing the main flow direction, and the side walls of the bypass part placed into the conduit form leading edges, in whose areas separated flows arise, which on the one hand can cause large pressure losses and on the other hand can cause an unintended pulsation in the flow, as a result of which pressure fluctuations are transmitted through the separation opening to the measurement channel that branches off from the inlet area. The pressure fluctuations in the measurement channel can significantly falsify the output signal of the measurement element.

SUMMARY OF THE INVENTION

Through a flow vane (baffle) situated after the separation opening (viewed in the main flow direction), the areas of separated flow at the side walls of the bypass part can be greatly reduced. This is because, with the flow vane, the flow (viewed in the main flow direction) comes into contact more rapidly with the side wall provided with the separation opening, thus reducing pressure losses in the area of the side wall provided with the separation opening and avoiding undesirable pulsations in the flow. The longitudinal extension of the flow vane in the main flow direction should not be too short, because otherwise the desired effect will not be achieved, or will be achieved only poorly.

As a function of the manner in which the conduit part is installed in the air intake section of an internal combustion engine, in many cases the conduit part must however have a shorter construction, so that the flow vane must be correspondingly shortened. In order to achieve a rapid impact of the flow even given a relatively short flow vane, the conduit part in the area of the bypass part is provided with at least one projection that protrudes from the inner wall of the conduit part towards the bypass part. The projection narrows the flow cross-section in the area of the bypass part, and accelerates the flow. The accelerated flow impacts more rapidly against the side wall and/or the flow vane, which can advantageously reduce the separation area. In this way, even with a relatively short flow vane pressure losses can be avoided and the reproducibility of the measurement result can be increased.

Advantageously, the projection is formed by an inner wall section, curved in edgeless fashion, of the conduit part. The projection can easily be manufactured during the manufacture of the conduit part as, for example, an injection-molded part. Due to the fact that the projection has no discontinuities or edges, the formation of undesirable flow separation areas at the projection is avoided.

An acceleration of the flow and an avoiding of the separation are achieved in particular by a projection that has, in a first plane perpendicular to the side wall of the bypass part, a first surface segment having a first curvature radius and a second surface segment, connected to and downstream from the first, that is formed as a flat or planar surface or is provided with a second curvature radius that is greater than the first curvature radius. In this way, an efficient flow acceleration is achieved in the area of the bypass part.

In an advantageous exemplary embodiment, only one flow vane is provided, which is situated on the same side in relation to the mid-axis of the conduit part as the side wall provided with the separation opening. This creates an asymmetrical construction behind the separation opening.

The flow vane can be situated immediately behind the rear wall of the bypass part (seen in the main flow direction), and can have an aerodynamically advantageous contour.

In addition, it is advantageous if the flow vane and the projection are combined with a flow diverting part situated in the conduit part before the bypass part (seen in the main flow direction), the flow diverting part having at least one diverting surface that faces the main flow direction and that, starting from an apex line situated at a distance from the bypass part, is curved in the same way on both sides towards the two side walls in such a way that the ends of the diverting surface remote from the apex line are aligned with the side walls. Through the combination of the flow vane behind the bypass part with the flow diverting part before the bypass part and the projection, a flow separation at the side wall, provided with the separation opening, of the bypass part is still more reliably avoided.

DETAILED DESCRIPTION

Figure 1:
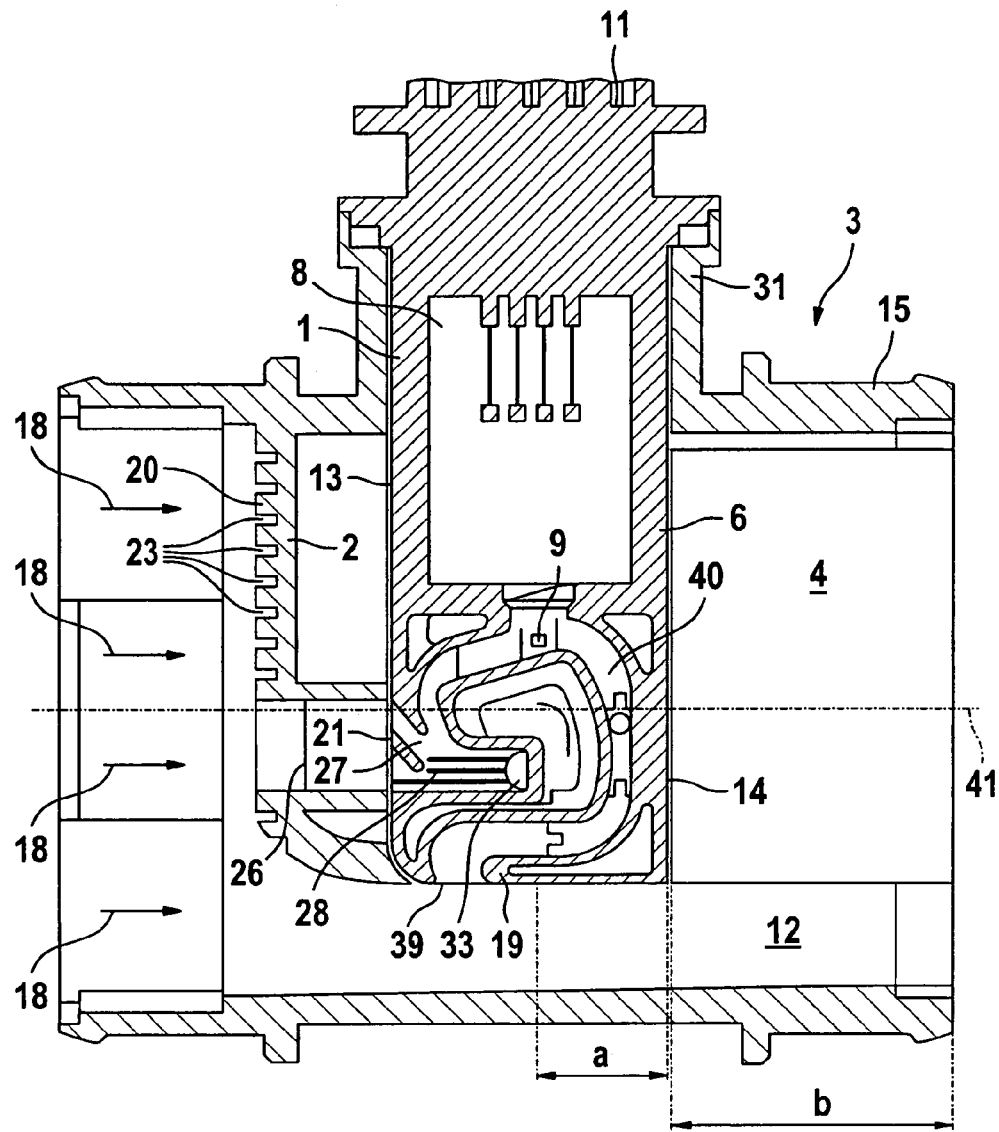
FIG. 1 shows a cross-section through an exemplary embodiment of the device according to the present invention.

FIG. 1 shows a conduit part 3 having an approximately wall 15 in the form of a cylindrical jacket that surrounds a conduit passageway 12 in which a medium flows in a main flow direction. Conduit part 15 has a cylindrical inner wall 5. The main flow direction is indicated by corresponding arrows 18 in FIG. 1, running there from left to right. The main flow direction is defined as the direction in which the medium, beginning from the inlet of conduit part 3, flows to its outlet mainly through the conduit passageway, even if local eddy formations and local areas of separation of the flow exhibit local deviations of the flow from the main flow direction, or if temporary changes of direction occur. Here, the main flow direction runs parallel to mid-axis 41 of cylindrical jacket wall 15 of conduit part 3. Conduit part 3 can for example be situated in an intake conduit of an internal combustion engine. The medium can for example be air flowing to the internal combustion engine.

A sensor device 1 is situated on conduit part 3 in such a way that a bypass part 6 of the sensor device, provided with a channel structure, protrudes into conduit passageway 12 in the manner of a finger, and is there exposed to the flowing medium with a predetermined orientation. During the insertion of bypass part 6 into conduit 3, it is ensured that the bypass part will have a predetermined orientation in relation to the main flow direction 18 of the medium. Sensor device 1 additionally has an electrical terminal 11 and a receptacle for a bearer part 8 connected to terminal 11, on which for example an evaluation electronics unit is situated. With bypass part 6, the sensor device can be introduced into conduit passageway 12 through a plug-in opening, surrounded by a flange 31, of wall 15 of conduit part 3. Bearer part 8 with the evaluation electronics unit can be situated inside and/or outside conduit passageway 12.

Sensor device 1 has a measurement element 9 situated on a measurement element bearer in a measurement canal 40; the measurement element is for example a thin-film measurement element having a sensor membrane with a heating resistor and two temperature-dependent resistors, whose measurement data can be evaluated by the evaluation electronics unit. Using measurement element 9, for example the volume flow or the mass flow of the flowing medium, in particular the air mass flow, is determined as a parameter. Additional parameters that can be measured include for example pressure, temperature, concentration of a component of a medium, or flow speed, which can be determined using suitable sensor elements.

Bypass part 6 has a housing having for example a cuboidal structure having a front wall 13 that in the installed position faces the main flow direction 18 of the medium and a rear wall 14 facing away therefrom, a first side wall 17 and a second side wall 16 parallel thereto, and a third wall 19 that runs for example parallel to the main flow direction and is situated at the end that is introduced into the conduit. In addition, part 6 has a channel structure situated therein, having an inlet area 27 and a measurement channel 40 that branches off from inlet area 27. A partial stream of the medium flowing in main flow direction 18 passes through an opening 21 on end surface 13 of bypass part 6 into inlet area 27 of the channel structure. From inlet area 27, the medium flows partly into measurement channel 40, provided with measurement element 9, and partly flows further into a separation zone 28 situated behind the branching point for the measurement channel, the separation zone opening into conduit passageway 12 via at least one separation opening 33 situated in first side wall 16 and/or second side wall 17. In the exemplary embodiment shown in FIG. 1, separation opening 33 is situated parallel to main flow direction 18. A first partial stream of the medium entering into inlet area 27 flows completely into measurement channel 40 and leaves this channel through opening 39 on wall 19, while a second partial stream flows completely through the one separation opening 33 back into conduit part 3. In the flowing medium, for example liquid and/or solid particles are present, such as oil or water particles, that can contaminate or damage measurement element 9. Due to separation opening 33 and the geometrical construction of the channel structure in the inlet area, the liquid and solid particles do not flow into the measurement channel, but rather flow back into conduit passageway 12.

Figure 2:
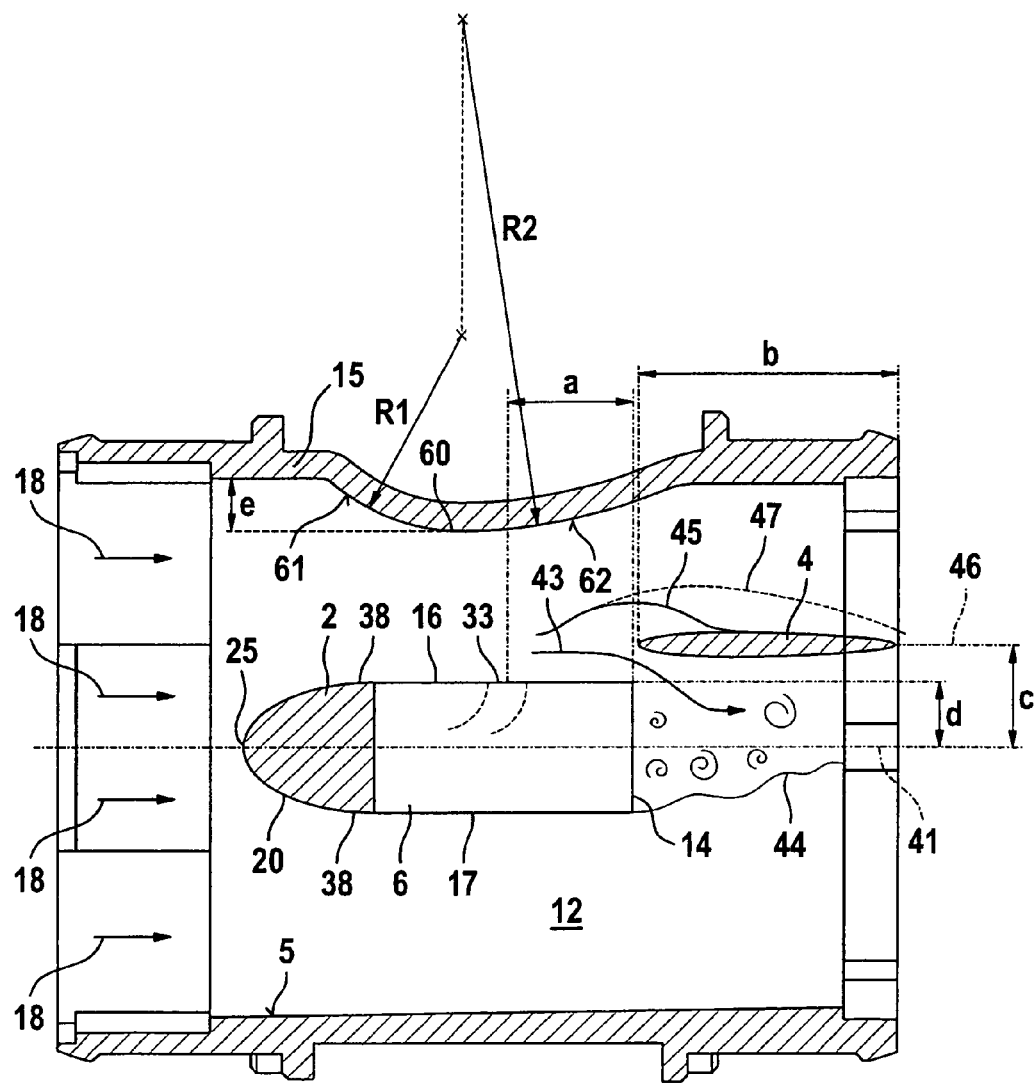
FIG. 2 shows a cross-section through FIG. 1.
Figure 3:
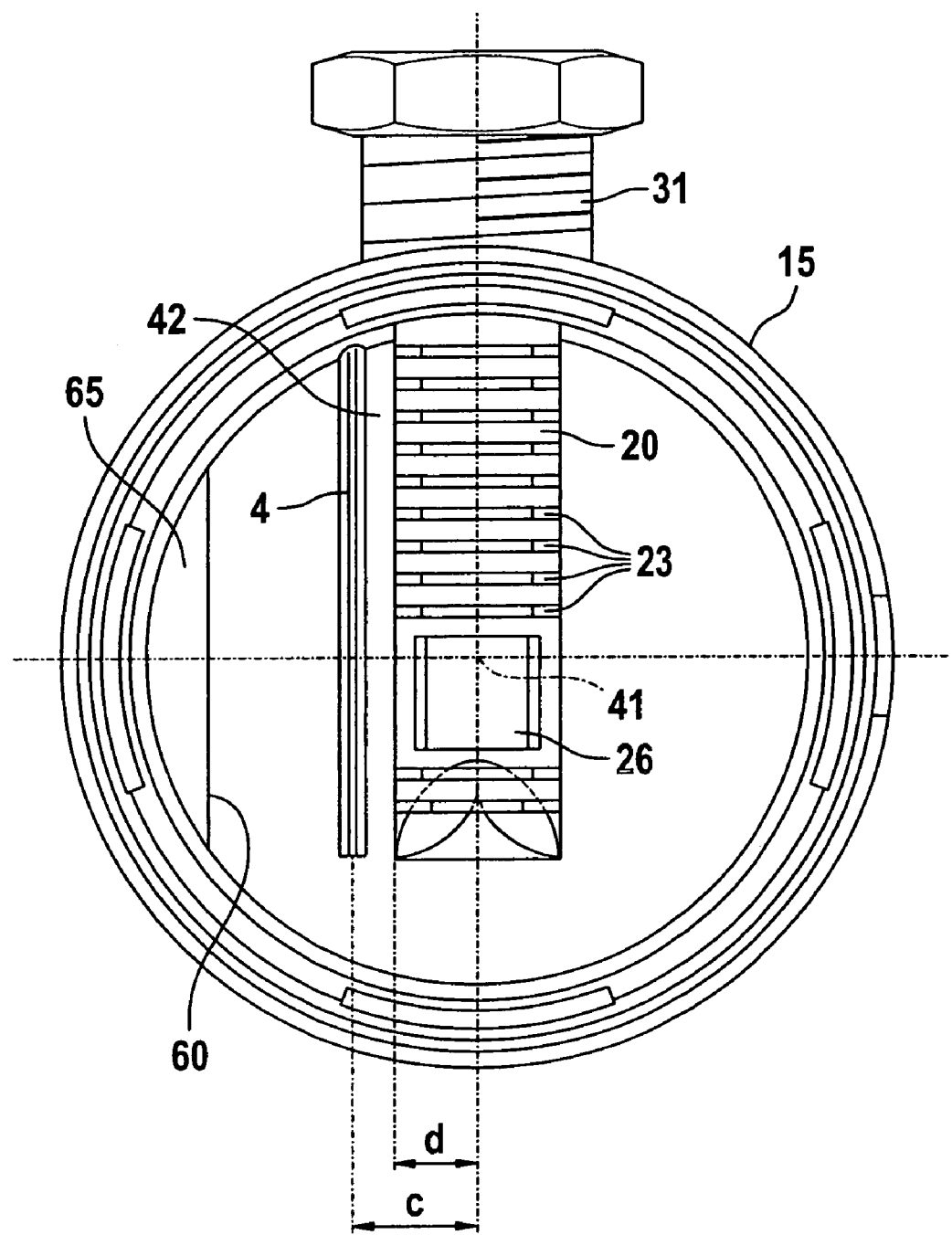
FIG. 3 shows a top view of the exemplary embodiment of FIG. 1.

As can be seen in FIGS. 1 to 3, a flow vane 4, running essentially parallel to side wall 16 of bypass part 6 provided with separation opening 33, is situated in conduit part 3 behind rear wall 14 of bypass part 6 (seen in main flow direction 18), preferably immediately behind it or almost immediately behind it (i.e., with a very small distance). It is also possible to situate flow vane 4 in FIG. 2 behind separation opening 33, and not immediately behind rear wall 14 of bypass part 6. The contour of flow vane 4 can have various shapes. The aerodynamically favorable fin-shaped contour shown in FIG. 2 is advantageous. Here it should be noted that flow vane 4, which is essentially parallel to side wall 16, need not necessarily have two flat outer surfaces. The contour of the outer surfaces can also be slightly curved, as is shown in FIG. 2. However, it should be recognized that midline 46 of flow vane 4 runs parallel to side wall 16 and has a distance c from mid-axis 41 of conduit part 3. The midline of the flow vane can also run at an angle smaller than ±15° to the side wall. In the context of the present application, a flow vane that runs at least approximately parallel to the side wall is therefore to be understood as a flow vane whose midline, in the section shown in FIG. 2, runs parallel or at an angle smaller than 15° to side wall 16, and thus also to main flow direction 18, since the main flow direction is parallel to side wall 16. The longitudinal extension b of flow vane 4, seen in main flow direction 18, is equal to or greater than the distance a of separation opening 33 from rear wall 14. For example, distance a=10 mm and longitudinal extension b is between 20 and 50 mm. The larger longitudinal extension b is, the better. However, the length of conduit part 3 places limits on the longitudinal extension b of the flow vane.

In order to achieve a rapid impact of the flow against the flow vane even given a relatively short longitudinal extension of the flow vane, in the area of the bypass part conduit part 3 is provided with at least one projection 60 that protrudes from inner wall 5 of conduit part 3 towards bypass part 6, as is shown in FIG. 2 and FIG. 3. Projection 60 narrows the flow cross-section in the area of bypass part 6, thus accelerating the flow. The accelerated flow is applied more rapidly against flow vane 4, thus enabling an advantageous reduction of the separation area. In FIG. 2, broken line 47 indicates the path of the separated flow without the projection, and solid line 45 indicates the path of the flow with projection 60 for a relatively short flow vane (b=25 mm). It can be seen that in the case of the flow accelerated by projection 60, the separation area is applied more rapidly to flow vane 4 than in the case without the projection. Thus, using projection 60, even given a relatively short flow vane a pressure loss can be avoided and the reproducibility of the measurement result can be increased.

Inner wall 5 of conduit part 3 is essentially cylindrical. In the exemplary embodiment shown in FIG. 2, projection 60 is formed by an inner wall segment 65 of conduit part 3 that is curved in edgeless fashion and that can preferably be formed concomitantly during the manufacture of the conduit part. Distance e of projection 60 from cylindrical inner wall 5 can be for example 5 mm. In the plane of FIG. 2, projection 60 has a first surface segment 61 having a first curvature radius R1 and a second surface segment 62, connected thereto and situated downstream therefrom, having a second curvature radius R2. First curvature radius R1 can for example be 19 mm and second curvature radius R2 can be for example 81 mm. As is shown in FIG. 3, inner wall segment 65, which forms projection 60, runs in the plane of FIG. 3 parallel to side wall 16 of bypass part 6.

Figure 4:
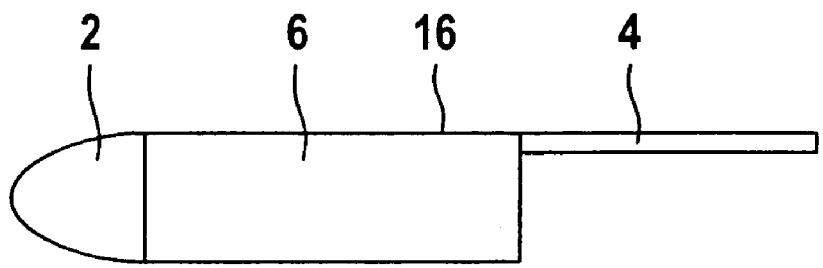
FIGS. 4, 5 and 6 show cross-sections through a sensor device and a flow vane for additional exemplary embodiments of the present invention.
Figure 5:
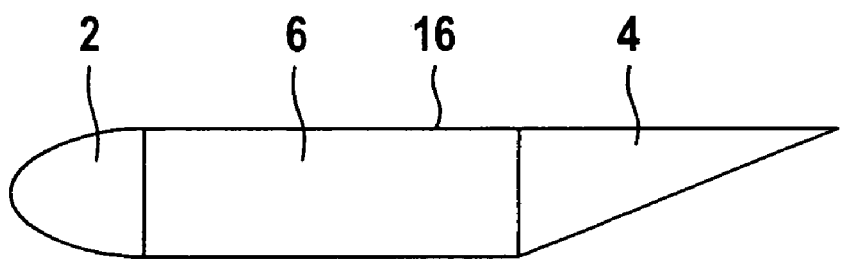
Figure 6:
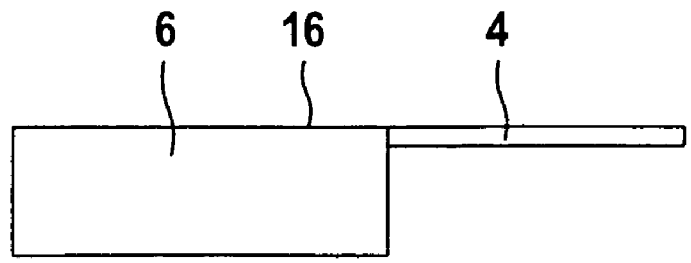

As can additionally be seen in FIG. 2, distance c of midline 46 of flow vane 4 from mid-axis 41 of conduit part 3 can also be greater than distance d of side wall 16, provided with separation opening 33, of bypass part 6 from mid-axis 41. This results in a gap 42, through which a stream of medium 43 can flow into dead water (eddy, wake) area 44 behind bypass part 6. The difference of distance c of flow vane 4 from mid-axis 41 and distance d of side wall 16, provided with separation opening 33, from mid-axis 41 is advantageously less than 10 mm, and is preferably formed so as to be less than 5 mm and greater than 1 mm. However, the difference c–d can also be zero. This is shown in the exemplary embodiments in FIGS. 4, 5, and 6, in which flow vane 4 is situated in a common plane with side wall 16 provided with separation opening 33. In these cases, no gap exists between side wall 16 and flow vane 4. However, the embodiment in which flow vane 4 has the gap, shown in FIG. 2, is particularly advantageous.

As can be seen in FIG. 2, only one flow vane 4 is provided, which is situated, in relation to mid-axis 41 of conduit part 3, on the same side as side wall 16 provided with separation opening 33. The air flowing along side walls 16, 17 becomes separated at the edge formed by rear wall 14 and side wall 17, so that a dead water area 44, shown in FIG. 2, results. Due to a partial vacuum in the dead water area in relation to the pressure conditions in the area of side walls 16, 17, at side wall 16, situated opposite side wall 17, a part of the air is suctioned through gap 42 between flow vane 4 and rear wall 14, into the dead water area (reference character 43), so that the separation area at side wall 16 provided with separation opening 33 is advantageously made smaller. In the exemplary embodiments of FIGS. 4, 5 and 6, the separation area at side wall 16 is likewise made smaller at least by an earlier application of the separated flow against flow vane 4, although this is not as strong as in the exemplary embodiment shown in FIG. 2.

As is also shown in FIG. 1 and FIG. 2, in all the exemplary embodiments a flow diverting part 2 can additionally be situated in conduit part 3, immediately before bypass part 6, seen in main flow direction 18. Flow diverting part 2 is manufactured as a separate component, but can also be formed in one piece with sensor device 1. The flow diverting part has a diverting surface 20 that faces main flow direction 18. As can best be seen in FIG. 2, starting from an apex line 25 that extends from bypass part 6 against the main flow direction, diverting surface 20 is curved in the same way at both sides towards the two side walls 16, 17, in such a way that the ends 38, remote from the apex line, of diverting surface 20 are formed so as to be aligned with side walls 16, 17 (the ends 38 make a transition to side walls 16, 17 continuously and without forming an edge). In the preferred exemplary embodiment shown here, diverting surface 20 is elliptically curved. Flow diverting part 2 additionally has a passageway opening 26 that is aligned with opening 21 of inlet area 27 of the channel structure, so that a partial stream of the medium flow in main flow direction 18 flows through passageway opening 26 and through opening 21 into inlet area 27.

In addition, a turbulence-producing structure 23 can be provided, as is shown in FIGS. 1 and 2. The turbulence-producing structure can be formed by a discontinuity and/or unevenness (for example, a small step, edge, ridge, etc.) at the uniformly curved diverting surface of the flow diverting part, or at least in the immediate vicinity of this surface, so that turbulences arise in the boundary layer of the stream. In the exemplary embodiment shown in FIG. 1, the structure is formed by a plurality of slits 23 made in diverting surface 20, situated in a plane perpendicular to side walls 16, 17 of bypass part 6 and parallel to main flow direction 18. The stream of medium impinging on diverting surface 20 is partly diverted along diverting surface 20 to side walls 16, 17, and partly penetrates into slits 23, and leaves slits 23 obliquely to main flow direction 18, producing strong longitudinal eddies that produce turbulences in the boundary layer stream at side walls 16, 17, so that the boundary layer is in any case turbulent and does not separate as easily.

Through the combination of flow diverting part 2 situated before the bypass part and flow vane 4 situated after the bypass part and projection 60, separation areas at side wall 16, provided with separation opening 33, of the bypass part are made smaller in particularly reliable fashion.

In order to avoid flow separations at the outer surfaces of the flow vane, the two outer surfaces, facing away from one another, of the flow vane can be provided with turbulence-producing structures that are formed for example by a row of projections that are preferably situated at regular intervals along a line and that stand out from the outer surface of flow vane 4 by between 0.2 and 2 mm, and preferably by approximately 1 mm.

What is claimed is:

1. A device for determining at least one parameter of a medium flowing in a conduit in a main flow direction, comprising:
    a conduit part that forms a conduit passageway;
    a sensor device having a bypass part that is situated in the conduit part in such a way that a partial stream of the medium flowing in the conduit part flows into an inlet area of a channel structure formed in the bypass part, the inlet area having at least one separation opening that, at a side wall of the bypass part, opens into the conduit passageway; and
    a flow vane extending at least about parallel to the side wall, having the separation opening, of the bypass part, the flow vane being situated in the conduit part, behind the separation opening, seen in the main flow direction,
    wherein the conduit part includes, in an area of the bypass part, at least one projection that protrudes from an inner wall of the conduit part towards the bypass part.

2. The device according to claim 1, wherein the device is for determining an air mass flow in an intake section of an internal combustion engine.

3. The device according to claim 1, wherein the inner wall of the conduit part is substantially cylindrical.

4. The device according to claim 1, wherein the projection is formed by an inner wall segment of the conduit part that is curved in an edgeless manner.

5. The device according to claim 1, wherein the projection has, in a plane perpendicular to the side wall, a first surface segment having a first curvature radius, and a second downstream surface segment connected thereto that one of (a) is formed as a flat surface and (b) has a second curvature radius that is greater than the first curvature radius.

6. The device according to claim 1, wherein the conduit part has a mid-axis that runs along the conduit passageway, and the separation opening has a distance from a rear wall of the bypass part, downstream in the main flow direction, and a longitudinal extension of the flow vane, seen in the main flow direction, is at least as great as the distance of the separation opening from the rear wall, and a distance of the flow vane from the mid-axis of the conduit part is at least as great as a distance of the side wall, having the separation opening, of the bypass part from the mid-axis.

7. The device according to claim 1, wherein only one flow vane is provided that is situated, in relation to a mid-axis of the conduit part, on the same side as the side wall having the separation opening.

8. The device according to claim 1, wherein the flow vane is situated at least about immediately behind the bypass part, seen in the main flow direction.

9. The device according to claim 1, wherein the flow vane has an aerodynamic contour.

10. The device according to claim 1, further comprising a flow diverting part situated in the conduit part before the bypass part, seen in the main flow direction, the flow diverting part having at least one diverting surface that faces the main flow direction and that, starting from an apex line situated at a distance from the bypass part, is curved in the same way on both sides towards two side walls, in such a way that ends of the diverting surface remote from the apex line are aligned with the side walls.

* * * * *